United States Patent [19]

Frasch et al.

[11] Patent Number: 4,773,323
[45] Date of Patent: Sep. 27, 1988

[54] DEVICE FOR SHELLING NUTS

[76] Inventors: Wilhelm Frasch, Auchtertweg 12; Karl Elser, Hauptstrasse 22, both of 7315 Weilheim 2 (Hepsisau), Fed. Rep. of Germany

[21] Appl. No.: 886,902

[22] Filed: Jul. 18, 1986

[30] Foreign Application Priority Data

Jul. 19, 1985 [DE] Fed. Rep. of Germany ....... 3525809

[51] Int. Cl.⁴ .............................................. A23N 5/00
[52] U.S. Cl. ...................................... 99/569; 99/574; 99/580; 99/609
[58] Field of Search ................................ 99/568–570, 99/574, 575, 579, 580, 518, 525, 530, 609–611; 209/673, 684, 687; 426/481–483

[56] References Cited

U.S. PATENT DOCUMENTS

| | | | |
|---|---|---|---|
| 1,342,692 | 6/1920 | Pape | 99/575 |
| 1,869,658 | 8/1932 | Brawda | 99/570 |
| 2,319,757 | 5/1943 | Vigneau | 99/569 |
| 3,951,056 | 4/1976 | McGehee | 99/569 |
| 4,201,126 | 5/1980 | Evans | 99/574 |
| 4,307,660 | 12/1981 | Clavel | 99/574 |

Primary Examiner—Timothy F. Simone
Attorney, Agent, or Firm—Foley & Lardner, Schwartz, Jeffery, Schwaab, Mack, Blumenthal & Evans

[57] ABSTRACT

A process for shelling nuts, particularly pistachio nuts, includes the step of slowly and continuously compressing the nuts in the longitudinal direction and not increasing the compression at the moment when the shells break.

This compression can preferably be effected in the longitudinal direction with the aid of two rotating disks arranged to be slightly inclined relative to each other.

26 Claims, 5 Drawing Sheets

DEVICE FOR SHELLING NUTS

This invention relates to a process and device for shelling nuts, particularly pistachio nuts, wherein the unshelled nuts are subjected to a force acting substantially in the longitudinal direction.

Pistachio nuts have a very strong shell of irregular shape. In contrast to walnuts, for example, they do not have a definite seam and their shells are irregular in shape. At the present time it is customary in the countries where they grow for pistachio nuts to be struck with stones or a hammer. An impulse is thus transmitted to the shell and leads to a deforming force. If this impulse is too slight, the shell remains closed. If on the other hand it is too great, the resistance decreases immediately after the shell bursts open, so that the hammerhead continues to move forward because of its great mass and destroys the pistachio nut itself. Since the force required to open pistachio nuts varies considerably, it is scarcely possible to achieve an economically reasonable result in this manner.

A process is also known by which pistachio nuts are opened with the aid of steam. Although the kernels then remain intact, nevertheless their quality suffers because of the heat. Other types of nut can be opened and shelled more easily, but here again difficulties continually occur, because nuts are natural products whose growth varies.

The problem underlying the invention is that of providing a process and a device for shelling nuts which can be applied economically, in which the quality of the shelled nuts is not impaired, which operates with a low rejection rate, and which can be applied in particular also to pistachio nuts.

According to the invention this problem is solved in that the nuts are gripped in the region of their ends, compressed to a continuously increasing extent in the longitudinal direction, and immediately released when the shell breaks. In comparison with hammer blows, the compression occurs relatively slowly, and the geometrical compression ensures that on the fracture of the shell no further force will act on the kernel. By this method it is therefore possible to obtain intact shelled pistachio nuts with a low rejection rate.

As a further development, provision may be made for the nuts to be moved preferably transversely of their longitudinal direction during the compression. This type of movement makes continuous operation particularly simple.

Since the irregular shape of the shells may have the consequence that the nuts will evade the compression while they are being gradually gripped, the invention further proposes that at least during the gripping and at the commencement of the compression the nuts can be guided laterally of their path of movement. Through this lateral guidance it is made impossible for the nuts to escape, so that the yield of the process is increased.

According to another feature of the invention, the nuts can be moved over a path dependent on their size during the compression. Since the nuts are of different sizes, and since these different sizes occur in a statistical distribution, it is thus ensured that two nuts will have the least possible influence on one another during the process proposed by the invention. It may be particularly advantageous for the nuts to be moved over a circular path.

Provision is made according to the invention for the nuts to be able to be presorted in accordance with their size before they are gripped. This can likewise increase the yield of the process.

In order to enable the nuts to be gripped and effectively compressed with the greatest possible certainty, provision may be made for the nuts to be aligned before they are gripped.

After the shell has been broken, provision may be made according to the invention for the opened nuts, together with their shells, to be subjected to air separation. This air separation serves to separate the larger shells from the smaller kernels. In this case it may be particularly advantageous for the opened nuts together with their shells or residues of shells to be passed into an upwardly directed suction current. This suction current then draws the shells upwards, while the shelled nuts fall downwards and can there be collected.

According to the invention provision may be made for a plurality of nuts to be compressed substantially simultaneously or overlappingly in respect of time. It is thus possible to increase the amount of nuts shelled per unit of time.

The invention also proposes a device for shelling nuts which according to the invention comprises at least one cyclically operated pressing member which is adapted to be driven by a drive and whose distance from a coacting member gradually decreases, as well as a feed device for bringing the unshelled nuts into the region between the pressing member and the coacting member. The feed device can for example bring nuts successively into the region of the coacting member, while from the other side the nut is compressed with the aid of a cam or the like.

It is however particularly advantageous for the device to comprise two rotating pressing members which are adapted to be driven by a drive and the distance between which gradually decreases in the direction of rotation, while the feed device brings the nuts into the region between the pressing members. The two pressing members may for example be chains or similar devices the distance between which decreases in the direction of their movement, and which compress the nuts between them. As soon as the shell has yielded, it can be discharged together with the nut.

As a further development provision may be made for a collector device receiving the shelled nuts and the shells or parts of shells to be disposed in the release region of the device, for example in the release region of the pressing members, and to be connected to a wind separation device. This collector device collects the nuts and the shells and guides them to the air separator device, which separates the shells from the nuts. The air separator device may for example be a horizontally acting blower. It is however particularly advantageous for the air separator device to have a vertically extending air separator tub which contains an upwardly directed current of air and to which the collector device, which is provided with a collector funnel, is connected via a tube provided with a constriction. It is thus possible to adjust the flow and speed of the air current in such a manner that the smaller kernels fall downwards while the larger shells are blown or sucked away in the upward direction.

It is particularly advantageous for an exhaust fan to be connected to the air separator tube to produce in the latter the upwardly directed current of air. It has been found that with a suction fan it is possible to produce a more constant current of air, which will thus lead to more uniform results. In addition, the use of a suction fan provides the advantage that air is also drawn in through the collector funnel, so that the power of the latter can be further increased. Air separation of this kind is also suitable for separating other mixtures.

The shelled nuts fall downwards through the air separator tube. According to the invention provision can now be made for the bottom end of the air separator tube to lie above a resorting device. With the aid of this resorting device the shelled nuts can be graded according to size. Furthermore, any nuts which have not been opened can then be fed back to the device.

Sorting devices of the kind used in accordance with the invention are known per se. They may for example consist of two contrarotating smooth cylindrical rollers, which can for example advantageously be disposed to be slightly divergent. Because of the contrarotation of the rollers and their inclination in relation to the horizontal, the nuts slide in the longitudinal direction on the rollers, while because of the slight divergence sorting according to size can be effected.

It is particularly advantageous for the pressing members to consist of two disks which rotate at the same speed and are slightly inclined relative to one another, and whose mutually facing surfaces are preferably slightly irregularly profiled. The slight irregular profiling serves to grip the nuts at their ends. Because of the slight inclination of the two disks, the nuts are then subjected to compression acting in the axial direction of the disks. The inclination of the two discs can be slightly varied in accordance with requirements, the size of the disks, the speed of rotation, and so on. It has been found particularly advantageous for the axes of rotation of the two disks to enclose with a horizontal plane an angle of a few degrees and, with a vertical plane, an angle about twice as large.

According to the invention provision may be made for the position of the shortest distance between the two disks to lie, viewed in the direction of rotation, downstream of the highest point and upstream of the horizontal diameter of the disks, preferably approximately in the region of about 45 to 60 degrees downstream of the apex.

According to the invention the feed device may have a rotating belt provided with prism-shaped humps extending transversely of its longitudinal direction and forming between them compartments, each of which will receive a nut lying transversely of the longitudinal direction of the belt. Cogged belts of this kind are relatively simple to make and result in a good feed device with the aid of which the nuts are aligned and delivered at regular intervals of time to the pressing members. When rotating pressing disks are used, the nuts are lifted out of the compartments by these disks.

Provision may advantageously be made for the belt to be guided over a pulley disposed approximately concentrically to the pressing disks and preferably driven conjointly with them. In this way the drive can be made particularly simple. It is naturally also possible for the belt to be moved at a different speed or also non-concentrically to the pressing disks.

In order to improve the alignment of the nuts, provision may be made for the belt to have a vibrating device in the region of the charging end remote from the pressing disks. The belt is thus vibrated to improve the alignment of the nuts.

According to the invention provision may be made for the feed device to be disposed between a charging point of a presorting device and the pressing members. This presorting device can be provided in order to presort the nuts according to size. Residues of shells or the like can also be separated there. According to the invention a transfer tube, through which the nuts slide, may then extend from the charging point of the presorting device to the charging point of the feed device.

In order to make the construction of the belt as simple as possible, provision may be made for guide plates to be disposed on both sides of the belt. These plates obviously need not be made of metal.

Provision may be made for stripper members to be disposed in the region of the charging point of the belt, in order to ensure uniform distribution of the nuts.

In the transition region between the feed member and the pressing disks resiliently mounted guide members may be provided to guide the nuts laterally and to hold them particularly in the compartments of the belt feed device. The guide members may in particular consist of a plurality of vertically movable springloaded slides, which are adapted to move independently, but only by a limited distance, in relation to the respective neighbouring slide.

The invention is suitable for opening or shelling various kinds of nuts, such as hazelnuts, walnuts, almonds, and the like. It is particularly valuable for shelling pistachio nuts, since hitherto these could be shelled industrially only with inadequate results.

Other features, details and advantages of the invention will emerge from the following description of preferred embodiments of the invention, taking as example the shelling of pistachio nuts, and with reference to the drawings, in which.

Figure 1:
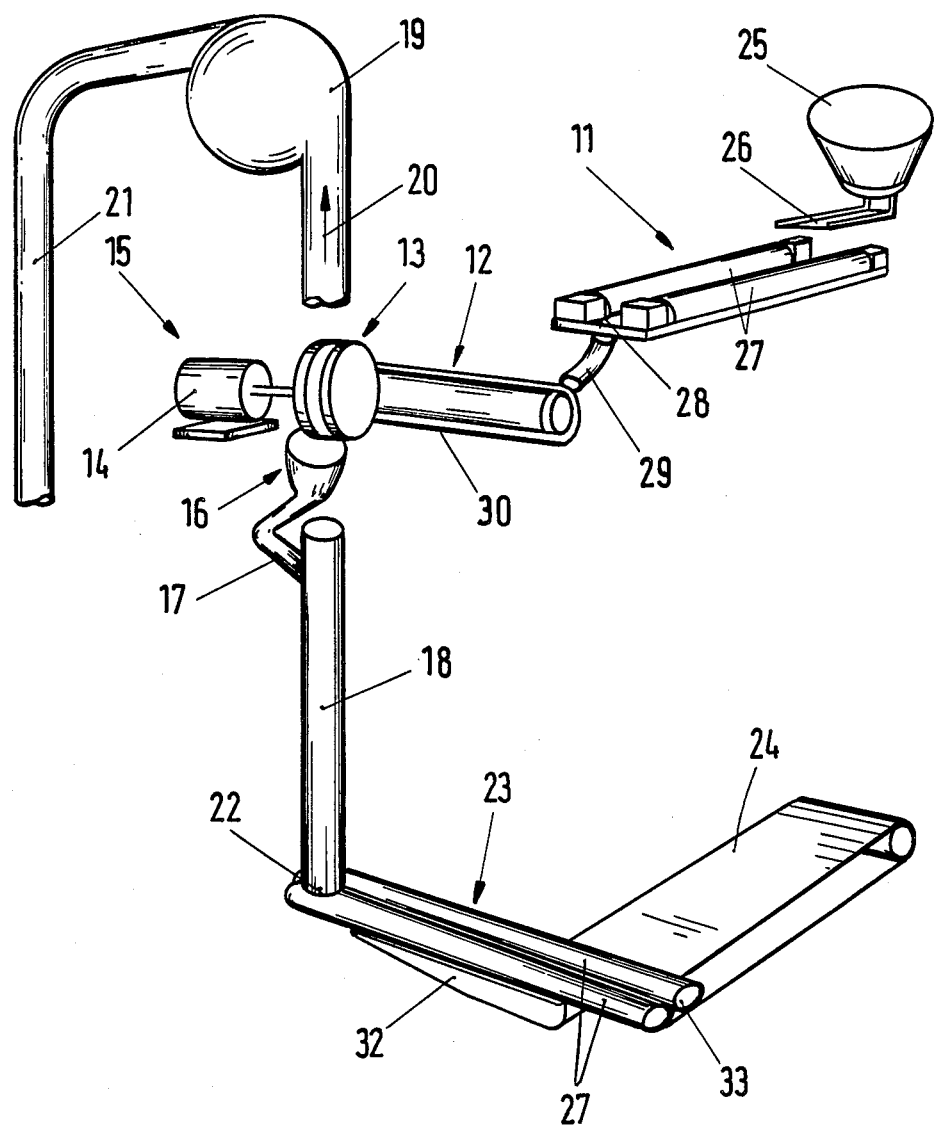
FIG. 1 is a greatly simplified schematic view in perspective of a device according to the invention.

FIG. 1 first shows a general view in perspective of the device proposed in accordance with the invention. The device contains a presorting device 11, from which a feed device 12 leads to the two pressing members 13. The pressing members 13 and the feed device 12 are driven by a drive means 15 in the form of an electric motor 14. In the region of the pressing members 13, or more precisely at their underside, is disposed a collecting funnel 16, shown in simplified manner, which is connected via a tube 17 to the air separator tube 18, shown broken away. The air separator tube 18 extends vertically and contains, above the pressing members 13, a suction fan 19 which draws in air in the direction of the arrow 20. The air is then carried off through an outlet pipe 21, the outgoing air also containing pistachio nut shells.

The bottom end 22 of the air separator tube 18 has its mouth directly above a resorting device 23, and the pistachio nuts leaving the resorting device 23 pass onto a conveyor belt 24. Resorting can be effected on this conveyor belt.

Figure 2:
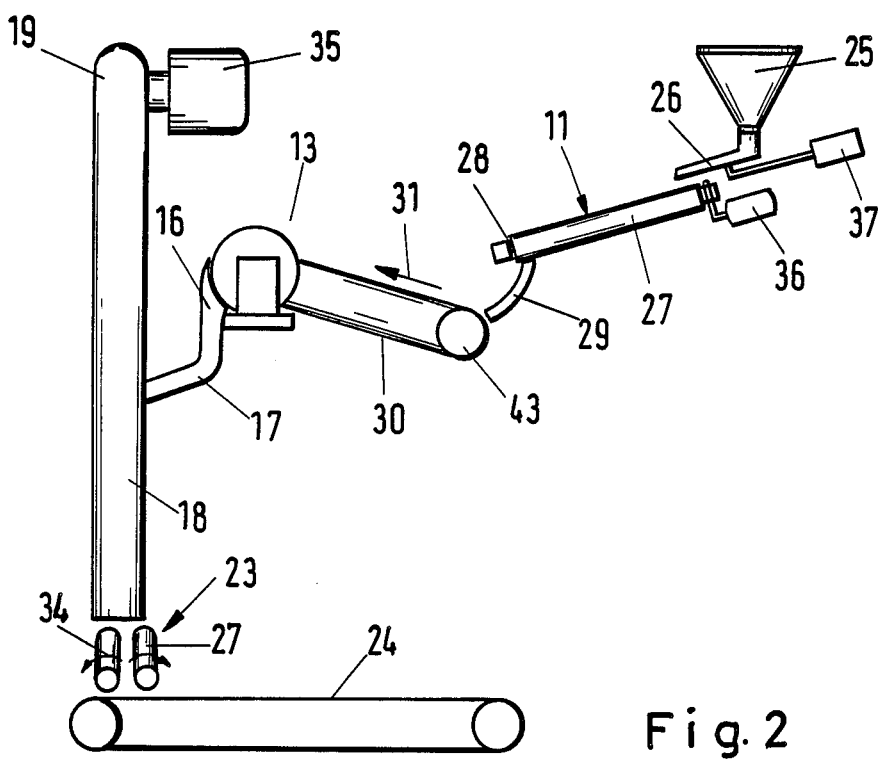
FIG. 2 shows the device viewed from front right in FIG. 1.

The mode of operation of the apparatus according to the invention, which is shown in FIG. 1, is as follows. The pistachio nuts are loaded into a hopper 25. From the latter they pass via a shaking chute 26 onto the presorting device, which is composed of two contrarotating rollers 27. With the aid of the presorting device 11 residues of shells or the like are removed. It is also possible to provide a plurality of presorting devices 11, so that for each device only pistachio nuts of a determined size are used. The pistachio nuts slide on the rotating rollers 27 from the charging point beneath the shaking chute 26 to their discharge point 28, from which they pass through a curved tube 29 onto the belt 30 of the feed device 12. The belt 30 is driven in the direction of the arrow 31 (FIG. 2). The pistachio nuts pass through the action of the upwardly moving belt 30 between the two pressing members 13, where they are compressed and thereby opened. The pistachio nuts together with their shells drop into the collector funnel 16 and pass via the tube 17 into the air separator tube 18. An upwardly directed current of air acts in the tube 18 and carries the shells away in the upward direction, while the pistachio nuts fall downwards through the air separator tube 18 onto the resorting device 23. The latter likewise consists of two contrarotating sorting rollers 27, which are likewise arranged to drop towards front right, but are not quite parallel. As soon as the pistachio nut has reached a point where the distance between the two sorting rollers 27 of the resorting device 23 is greater than the size of the pistachio nut, it falls downwards and then passes via a chute 32 or directly onto the conveyor belt 24. If an occasional unopened pistachio nut falls out of the tube 18, it will leave the resorting device 23 at its free end 33, where it can pass into a special vessel and then can be returned to the hopper 25.

In FIG. 2, which shows the device of FIG. 1 viewed from front right, it can be seen that the sorting rollers 27 of the resorting device 23 extend with a slight drop and slight divergence. They rotate in the direction of the arrows 34. The pistachio nuts therefore slide from the free end 22 of the air separator 18 in the direction of the free end 33 of the resorting device 23.

The air separator tube 18 extends vertically. The suction fan 19 disposed above the pressing members 13 is driven by a motor 35. The tube 17 between the collector funnel 16 and the air separator tube 18 has a diameter considerably smaller than that of the air separator tube 18, and its last portion extends obliquely downwards in a straight line. The collector funnel 16 is constructed in such a manner that it reaches as close as possible to the pressing members 13, so that the air current provided by the fan 19 also produces suction through the funnel 16 and the tube 17.

The upper portion of the belt 30, approaching the pressing elements 13, extends in the upward direction at an angle of about 24 degrees to the horizontal.

The presorting device 11, which likewise comprises two contrarotating sorting rollers 27, extends downwards from its charging end to its discharge point 28, so that the pistachio nuts slide along the rollers 27. The two rollers 27 are driven in opposite directions with the aid of a motor 36.

The shaking chute 26 disposed under the funnel 25 is vibrated with the aid of a drive 37.

Figure 3:
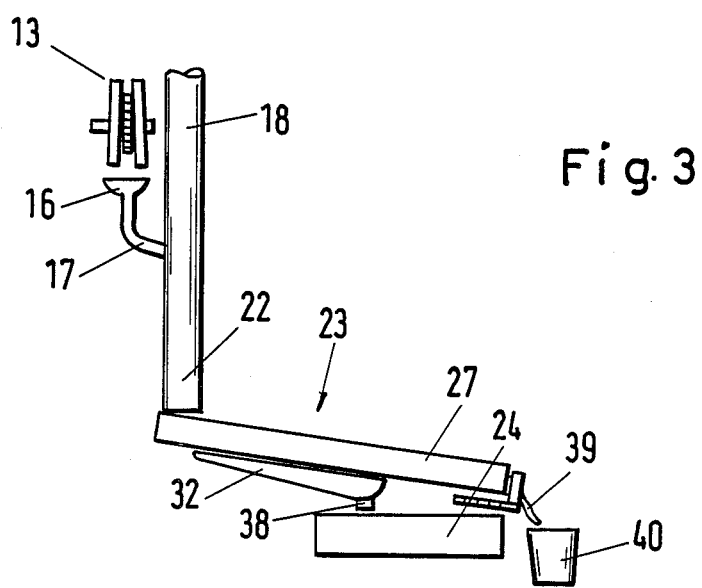
FIG. 3 shows the device viewed from front left in FIG. 1.

FIG. 3 shows once again the resorting device 23, which is disposed under the air separator tube 18. The chute 32 is disposed beneath the sorting rollers 27, its outlet 38 lying in the region of the left-hand half of the conveyor belt 24. This results in a certain coarse sorting of the pistachio nuts into large and small nuts, the larger ones arriving in the region of the right-hand half of the conveyor belt 24. Any unopened pistachio nuts pass into a vessel 40 via a short chute 39.

Figure 4:
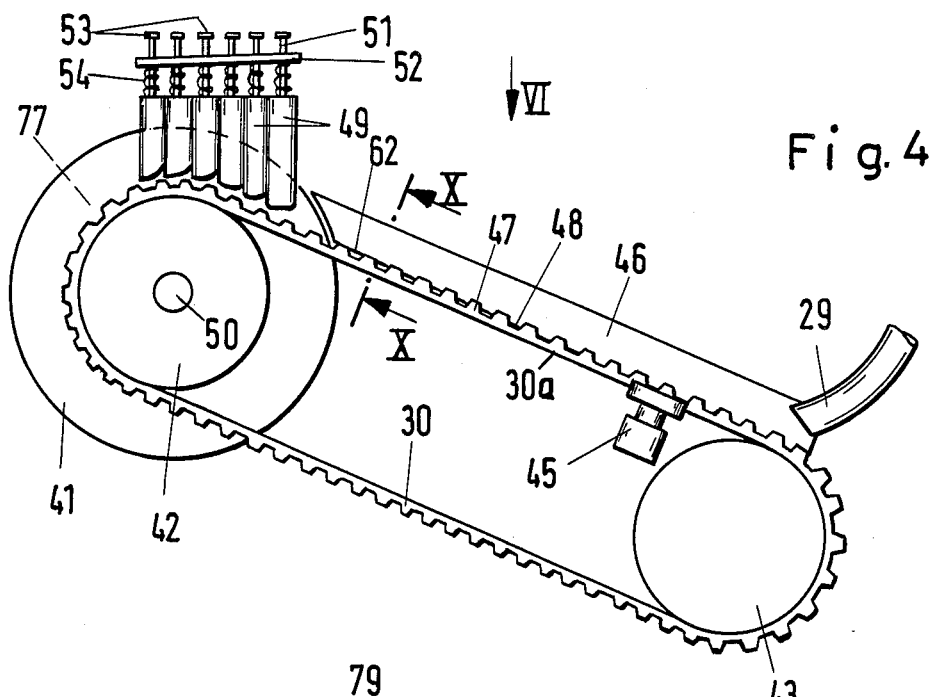
FIG. 4 is a simplified representation on a larger scale of the feed device and pressing disks.
Figure 5:
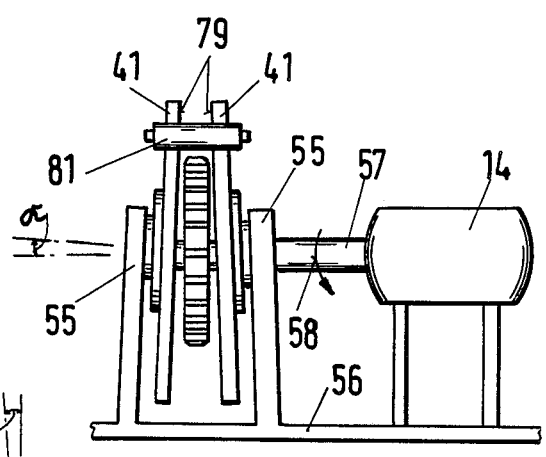
FIG. 5 is a simplified, broken-away representation of the arrangement shown in FIG. 4, viewed in the direction of the arrow V.

Details of the pressing members 13 can be seen in FIGS. 4 and 5. From FIG. 5 it can be seen that the two pressing members are in the form of pressing disks 41, which extend slightly obliquely in relation to one another. A pulley 42 is mounted concentrically to the pressing disks 41 and is likewise driven by the motor 14. It turns at the same speed as the pressing disks 41. The pulley has a smaller diameter than the two pressing disks 41, its diameter amounting to about 55% of that of the pressing disks 41. The belt 30 extends around the pulley 42 and is guided over a second ond, freewheeling pulley 43. The charging point of the feed device constituted by the belt 30 lies approximately on the upper side of the second, undriven pulley 43. The mouth of the transfer tube 29 coming from the presorting device lies at that point. Immediately downstream of the undriven pulley 43, referring to the direction of movement, is disposed a vibration device 45, which vibrates the belt 30. A guide plate 46 is disposed on each side of the belt 30 in its portion 30a which serves to convey the pistachio nuts. The guide plates 46 prevent the pistachio nuts from slipping off the sides of the belt 30, so that a simpler belt can be used. The humps 47 which are provided on the outer side of the belt, and which are approximately trapeziform in shape, bound between them compartments 48, which are likewise approximately trapeziform and in which the pistachio nuts lie.

In the region above the driven pulley 42 a total of six guide members 49 are disposed between the pressing disks 41, with their lower faces lying approximately above the upper face of the humps 47 in the unloaded state. The guide members are disposed substantially to the right of a vertical line extending through the axis 50 of the pulley 42. They are slidable in the vertical direction, for example by means of plates disposed in front of and behind the plane of the drawing. Each of them is guided with the aid of a pin 51 fastened on the guide member 49 and extending through a crossbar 52. Above the crossbar 52 each pin has a widened portion, for example a nut 53. Beneath the crossbar 52 a spring 54 is disposed around each pin 51 and is supported on the upper face of the guide members 49. The guide members 49 serve to hold the pistachio nuts in the respective compartments 48 on the belt 30 until they are gripped sufficiently firmly by the converging pressing disks 41 to prevent any possibility of the nuts being released.

Figure 6:
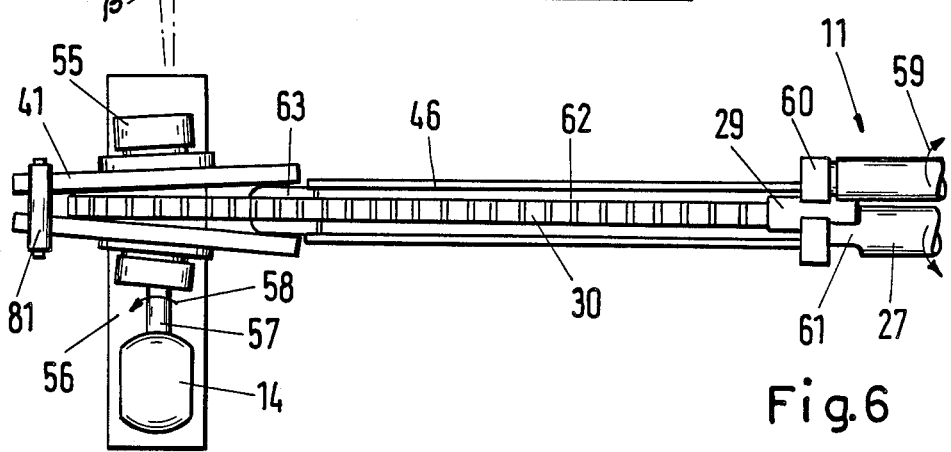
FIG. 6 is a plan view of the arrangement shown in FIG. 4, viewed in the direction of the arrow VI.

In FIG. 5 it can be seen that the two pressing disks 41 converge slightly in the upward direction, and in FIG. 6 it can be seen that they also converge slightly in the forward direction. The two disks are mounted in bearings 55 fastened on a common baseplate 56. The electric motor 14, whose output shaft 57 turns in the direction of the arrow 58, is also fastened on the baseplate 56. A slightly flexible coupling of an ordinary commercially available type is interposed between the output shaft 57 and the pressing disk 41. A flexible coupling of this type is also disposed between the pressing disk on the right in FIG. 5 and the pulley 42, and also between the pulley 42 and the pressing disk 41 on the left in FIG. 5.

A rotatably mounted rubber roller 81 acts on the outer periphery of the two pressing disks 41. The the axis of rotation of the rubber roller 81 extends approximately parallel to the axis of rotation of the two pressing disks. The rubber roller 81 is disposed in such a manner that it acts with a certain force on the outer periphery of the pressing disks 41. The play of the two disks in the direction of rotation, resulting from the flexible coupling, can be reduced or in certain circumstances even completely eliminated by the rubber roller 81. This arrangement is particularly expedient when a plurality of such pressing units 13 are disposed side by side and driven by the same motor 14. In this case the rotational play is cumulative. The arrangement of a plurality of pressing units driven by a common motor is nevertheless particularly expedient.

FIG. 6 shows on the right a plan view of the outlet end of the presorting device 11. The two rollers 27, which turn in the direction of the arrows 59, are mounted in bearings 60. One of the two rollers 27 has an end 61 of smaller diameter, so that a gap is formed there. The pistachio nuts fall through this gap into the upper end of the transfer tube 29, from where they pass onto the upper face of the belt 30.

Between the belt and each of the guide plates 46 is disposed a respective guide rail 62, these guide rails extending in the longitudinal direction of the belt 30 and being riveted to the guide plates 46. At their front end, directed towards the pressing disks 41, they are extended in the form of parts 63 of plastic material, which lie between the disks 41 and the belt 30, being pressed against the latter. The vibration of the belt 30 is thus reduced in this region.

As can be seen from FIG. 4, the guide rails 62 are inclined upwards to a slightly greater extent than the belt 30, so that just in front of the pressing disks 41 they lie at a higher level than the floor of the compartments 48, on both sides of the belt 30.

Figure 7:
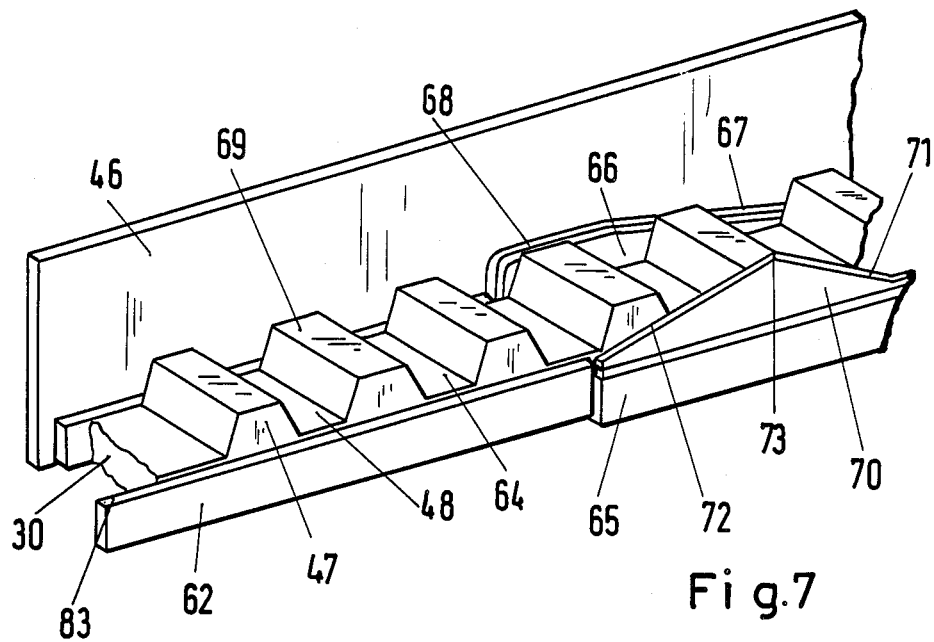
FIG. 7 shows in perspective and on a much larger scale a detail of the charging point of the feed belt.

FIG. 7 shows on a larger scale details of the belt 30, guide plates 46 and guide rails 62. The belt 30 is provided on its upper face with the humps 47, which are approximately trapeziform in cross-section. The shorter side 69 of the trapezium is in each case directed upwards. Compartments 48, which are likewise trapeziform, are thus formed between the humps 47. The guide rails 62 are disposed on both sides of the belt 30, with their top edges 83 approximately flush with the bottom surfaces 64 of the compartments 48 in this region. The guide rails 62 are interrupted in the region of the charging point 44 and replaced with a channel 65, which embraces the belt in its region free from humps and which is connected to the vibration device 45. At this point the belt 30 is set in vibration. On the right-hand side, referring to the direction of movement of the belt 30, a stripper member 66 is disposed; this member has a slowly rising ramp 67 followed by a region 68 extending parallel to the belt 30. The parallel region 68 is at the same height as the upper face 69 of the humps 47.

A second stripper member 70 of asymmetrical construction in relation to the first stripper member 66 is disposed opposite the latter. It has a rising ramp 71 followed by a descending ramp 72. The apex 73 formed between the ramps 71 and 72 is at a higher level than the upper face 69 of the humps 47. The cooperation of the two stripper members ensures that only one pistachio nut will lie in the compartments between each two humps 47. If more than one pistachio nut should lie in one compartment, they will be raised on one side and the upper nut will be forced off to the rear, that is to say to the right in FIG. 7.

Figure 8:
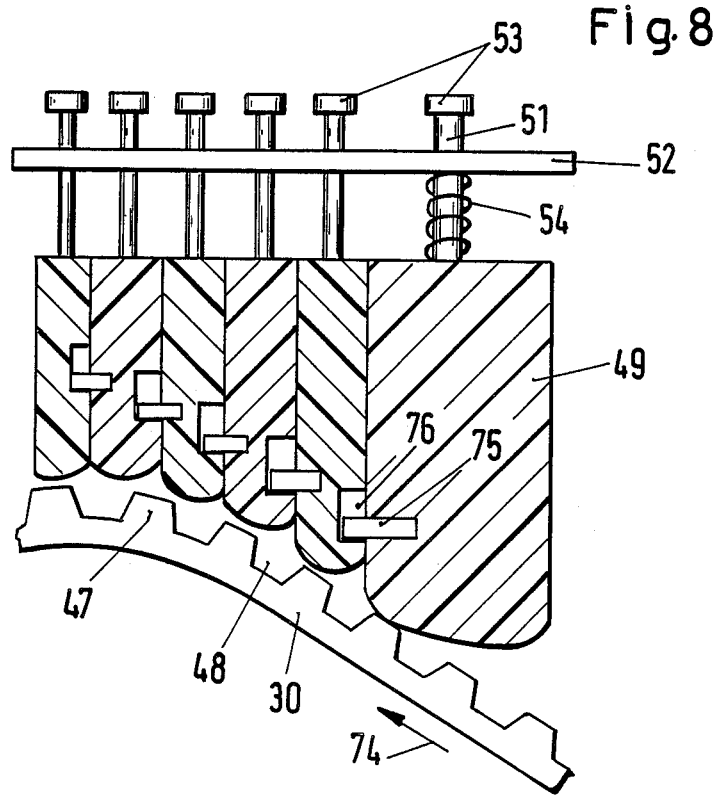
FIG. 8 is a simplified sectional representation of the guide members.

FIG. 8 now shows on a larger scale the guide members 49 which have already been seen in FIG. 4. The belt 30 moves in the direction of the arrow 74. Each guide member 49 can be lifted against the action of the springs 54. With the exception of the guide member in the extreme left-hand position in FIG. 8, each guide member 49 is provided with a pin 75 which engages in a longitudinal slot 76 in the respective guide member 49 in the neighbouring position on the left. If therefore a guide member 49 should be raised by an incorrectly disposed pistachio nut, or one that is too large, after it has been raised a determined distance the next guide member on its left, that is to say lying next to it in the direction of movement of the belt 30, will also be raised. Each pistachio nut is guided by these guide members until it is sufficiently firmly clamped between the two pressing plates 41 to prevent it from escaping to one side as the compression proceeds.

The mode of operation of the device is as follows. The pistachio nuts lying in the compartments between the humps 47 are aligned transversely of the longitudinal direction of the belt 30, that is to say the longitudinal direction of the pistachio nuts extends across the belt 30. The nuts now come between the two pressing disks 41. The farther they move on the belt 30 between the two pressing disks 41, the shorter the distance between the pressing disks will become, since the narrowest space between them lies approximately at the mark 77 in the form of a broken line in FIG. 4. As soon as the pistachio nuts have reached a position where the distance between the two pressing disks is somewhat shorter than their longitudinal dimension, they are gripped by the pressing disks and lifted obliquely out of the compartments 48 on the belt 30. They then move on the path of a circular arc, along which path the two regions of the pressing disks holding the ends of the pistachio nuts become increasingly close to one another. At some point the compression is then sufficient to burst the shell open. No further conmpression then occurs, because the pressing disks approach one another purely geometrically and without momentum. After the shell has been broken the pistachio nut is thus free of any action of a force, and under its own weight it can fall into the collector funnel 16. If the shell is broken in a region in which it will still fall onto the belt 30, this is not detrimental because shells and shelled nuts can also be conveyed by the belt.

Figure 10:
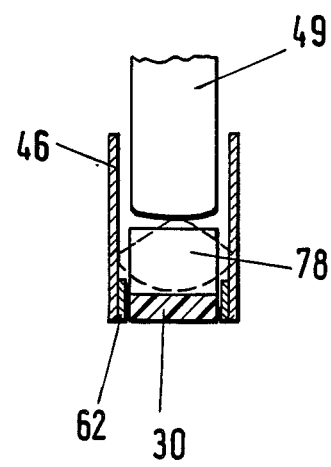
FIG. 10 is a section through the belt approximately on the line X—X in FIG. 4.

FIG. 10 shows, in a section through the belt 30, a pistachio nut 78 drawn in broken lines. This nut lies in a compartment 48 between two humps 47, and is guided on the right and the left by the two guide plates 46 and at the top by the guide member 49. Consequently, it cannot escape and in this way is conveyed, correctly aligned, between the pressing disks 41.

Figure 9:
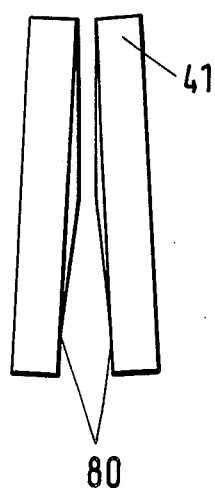
FIG. 9 shows schematically two pressing disks having a modified surface.

FIG. 9 shows a slightly modified form of construction of the pressing disks 41. Whereas the pressing disks 41 shown in FIGS. 5 and 6 have plane surfaces 79 facing one another, the pressing surfaces 80 of the pressing disks 41 are here slightly conical. It is therefore possible for the minimum distance between the pressing surfaces 80 lying opposite one another to be identical at all points in the narrowest part, irrespective of the radius. It is naturally also possible to ensure that the minimum distance between the pressing surfaces of the pressing disks 41 will be greater at the outer edge than in the direction of the centre of the disks. With the arrangement of the feed device shown in FIG. 4, it is obviously sufficient for the pressing surfaces 80 to be made conical.

In one example of embodiment the pressing disks 41 have a diameter of 18 centimeters, the pulley 42 has a diameter of 10 centimeters, the width of the belt is 13 millimeters, and the pressing disks rotate at a speed between 17 and 85 revolutions per minute. If it is assumed that the operation of compressing the pistachio nut extends over an angular region of about one fourth of a revolution before the shell of the nut yields, this would mean, at the maximum speed of rotation indicated, a compression time of about one sixth of a second. The compression process accordingly takes place substantially more slowly than in the case of shelling by means of a blow.

We claim:

1. A device for shelling nuts, comprising:
   two rotating pressing members comprising rotating disks which have mutually facing surfaces and which are inclined with respect to each other so that the distance between them gradually decreases in the direction of rotation;
   a drive for rotating the two pressing members at the same speed;
   a presorting device having a discharging point for delivering presorted nuts;
   a feed device positioned betwen the discharging point of said presorting device and said pressing members, for bringing unshelled nuts into a region between the pressing members;
   a collector device positioned adjacent a release region of said pressing members for receiving shelled nuts and shell parts; and
   an air separator device connected to said collector device for separating shelled nuts from shell parts.

2. A device as claimed in claim 1, wherein said charging device comprises a pulley disposed approximately concentricallly with said pressing disks and a belt guided over said pulley, said belt rising from said discharging point of said presorting device toward said pressing disks at an angle with respect to the horizontal of from about 15 to about 30 degrees.

3. A device as claimed in claim 1, wherein the air separator device comprises a vertically extending air separator tube and means for providing an upwardly directed current of air in said separator tube, and wherein the collector device comprises a collector funnel and a tube having a constriction, said tube being connected to said separator tube.

4. A device as claimed in claim 3, wherein said air current providing means comprises a suction fan connected to the air separator tube.

5. A device as claimed in claim 3, further comprising a re-sorting device located beneath the bottom end of the air separator tube.

6. A device as claimed in claim 5, wherein the resorting device comprises two contra-rotating sorting rollers which diverge slightly in a direction toward their ends away from said air separator tube.

7. A device according to claim 1, wherein the mutually facing surfaces of said pressing disks are irregularly profiled.

8. A device as claimed in claim 7, wherein the pressing disks have axes of rotation that enclose with a horizontal plane an angle of about 1 to 2 degrees, and with a vertical plane an angle of about 2 to 6 degrees.

9. A device as claimed in claim 7, wherein the pressing disks have a shortest distance between them at a position which lies, viewed in the direction of rotation, downstream of the highest point and upstream of the horizontal diameter of the disks.

10. A device as claimed in claim 9, wherein said position lies in a region of about 30 to 60 degrees downstream of the highest point.

11. A device as claimed in claim 2, wherein said belt comprises approximately prism-shaped humps extending transversely of its longitudinal direction and forming betwen them compartments, each of which will receive a nut lying transversely of the longitudinal direction of the belt.

12. A device as claimed in claim 11, wherein the belt is driven conjointly with the pressing disks.

13. A device as claimed in claim 2, the belt encloses with the horizontal an angle of about 24 degrees.

14. A device as claimed in claim 1, further comprising a vibrating device for vibrating the belt in the region of its end remote from the pressing members.

15. A device as claimed in claim 1, wherein the presorting device comprises a transfer tube which extends from its discharging point to a point adjacent the feed device.

16. A device as claimed in claim 11, further comprising guide plates disposed on both sides of an upper portion of the belt.

17. A device as claimed in claim 16, further comprising stripper members disposed in the region of the belt adjacent the discharging point of said presorting device, for eliminating all but a single nut in each of said compartments.

18. A device as claimed in claim 1, further comprising in a transition region between the feed device and the pressing members, a plurality of resiliently mounted guide members for guiding nuts in the feed device.

19. A device as claimed in claim 18, wherein the guide members comprises a plurality of vertically movable spring-loaded slides which are adapted to move a limited distance in relation to a respective neighboring slide.

20. A device as claimed in claim 1, wherein the mutually facing surfaces of the pressing disks are planar.

21. A device as claimed in claim 1, wherein the mutually facing surfaces of the pressing disks are or slightly conical or frustoconical in shape.

22. A device for shelling nuts, comprising:
   two rotating pressing members comprising rotating disks which have mutually facing surfaces and which are inclined with respect to each other so that the distance between them gradually decreases in the direction of rotation, wherein the mutually facing surfaces are slightly conical or frustoconical in shape;
   a drive for rotating the two pressing members at the same speed;
   a feed device for bringing unshelled nuts into a region between the pressing members;
   a collector device positioned adjacent a release region of said pressing members for receiving shelled nuts and shell parts; and
   an air separator device connected to said collector device for separating shelled nuts from shell parts.

23. A device for shelling nuts, comprising:

two rotating pressing members which have mutually facing surfaces and which are inclined with respect to each other so that the distance between them gradually decreases in the direction of rotation;

a drive for rotating the two pressing members;

a feed device for bringing unshelled nuts into a region between the pressing members, said feed device comprising an endless belt having a plurality of compartments extending transversely of its longitudinal direction, each compartment for receiving a nut;

means, positioned near an end of said belt remote from said pressing members, for eliminating all but one nut from each compartment;

a collector device positioned adjacent a release region of said pressing members for receiving shelled nuts and shell parts; and an air separator device connected to said collector device for separating shelled nuts from shell parts.

24. A device as claimed in claim 23, wherein said eliminating means comprises means for vibrating the belt.

25. A device as claimed in claim 24, wherein said eliminating means further comprises stripper members located on each side of the belt.

26. A device as claimed in claim 23, further comprising a plurality of resiliently mounted guide members positioned in a transition region between the feed device and the pressing members, for guiding nuts located in said compartments.

* * * * *